United States Patent
Ishii

(10) Patent No.: US 7,551,838 B2
(45) Date of Patent: Jun. 23, 2009

(54) MOVING PICTURE RECORDING APPARATUS AND METHOD THEREOF WITH CORRELATING OF REPRESENTATIVE IMAGE WITH THUMBNAIL IMAGE RECORDED IN THUMBNAIL FILE CORRESPONDING TO MOVING PICTURE STREAM DATA REFERENCED BY REFERENCE MOVING PICTURE DATA

(75) Inventor: Yoshiki Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1031 days.

(21) Appl. No.: 10/876,667

(22) Filed: Jun. 28, 2004

(65) Prior Publication Data

US 2005/0030391 A1 Feb. 10, 2005

(30) Foreign Application Priority Data

Jul. 9, 2003 (JP) ............................. 2003-194548

(51) Int. Cl.
*H04N 5/76* (2006.01)

(52) U.S. Cl. ..................................... 386/95; 386/126

(58) Field of Classification Search .................. 386/46, 386/53, 125, 95, 124, 126, 52, 55, 108, 109
See application file for complete search history.

(56) References Cited

U.S. PATENT DOCUMENTS

| | | | | |
|---|---|---|---|---|
| 6,052,507 | A | 4/2000 | Niida et al. | ............ 386/68 |
| 6,871,205 | B1 * | 3/2005 | Yamada et al. | ............ 707/104.1 |
| 2002/0149682 | A1 | 10/2002 | Kudo | ............ 348/231.4 |
| 2003/0086568 | A1 * | 5/2003 | Kato et al. | ............ 380/201 |
| 2004/0170394 | A1 * | 9/2004 | Kiyama et al. | ............ 386/111 |
| 2005/0047681 | A1 * | 3/2005 | Hori et al. | ............ 382/305 |
| 2005/0226603 | A1 * | 10/2005 | Hirabayashi et al. | ............ 386/95 |

FOREIGN PATENT DOCUMENTS

| | | |
|---|---|---|
| EP | 1 089 199 A2 | 4/2001 |
| EP | 1 418 508 A1 | 5/2004 |
| JP | 09306147 | * 11/1997 |
| JP | 2001-157175 | 6/2001 |
| JP | 2002-314916 | 10/2002 |
| JP | 2003-032581 | 1/2003 |
| JP | 2003-050811 | 2/2003 |
| WO | WO 02/104016 | * 12/2002 |

OTHER PUBLICATIONS

Musha et al, Machine translation of JP 09306147, Nov. 1997.*
Osamu et al, Machine generated translation of JP 2001-157175, Jun. 2001.*

* cited by examiner

*Primary Examiner*—David E Harvey
(74) *Attorney, Agent, or Firm*—Fitzpatrick, Cella, Harper & Scinto

(57) ABSTRACT

The present invention provides a moving picture recording apparatus and method of recording moving picture signals as compression coded moving picture data together with reference moving picture data that references the moving picture data in a storage medium. Time data for designating a representative image of the moving picture data is designated, the representative image (poster frame) is read out and decoded, and a thumbnail image of the moving picture data is generated based on the representative image. The thumbnail image is encoded and written to a thumbnail file, and the representative image and corresponding thumbnail image recorded in the thumbnail file are correlated by a management file.

10 Claims, 14 Drawing Sheets

MOVING PICTURE RECORDING APPARATUS AND METHOD THEREOF WITH CORRELATING OF REPRESENTATIVE IMAGE WITH THUMBNAIL IMAGE RECORDED IN THUMBNAIL FILE CORRESPONDING TO MOVING PICTURE STREAM DATA REFERENCED BY REFERENCE MOVING PICTURE DATA

FIELD OF THE INVENTION

The present invention relates to a moving picture recording apparatus and method thereof.

BACKGROUND OF THE INVENTION

In recent years, a disk video camera apparatus has been developed that can record moving pictures encoded in MPEG2 format onto DVD-standard disk media as well as reproduce the DVD. In such a disk video camera apparatus, moving pictures from the start of recording to a pause therein are stored as a single video clip in a single file. Thus, a plurality of video clip files are created on a disk, and the recorded moving pictures can be reproduced by displaying and selecting an index screen of the video clip or by continuous reproduction. A video camera of such type is disclosed, for example, in Japanese Patent Application Laid-Open No. 2002-314916.

FIG. 14 illustrates the flow of signals during image sensing in a conventional disk video camera apparatus.

Reference numeral 1401 designates the camera optical system, which focuses a subject image onto an image sensing element 1402 at an appropriate focal length and exposure by using a camera controller 1405 to control driving of the focus and the aperture (f-stop). The image sensing element 1402 converts light from the optical system 1401 into electrical signals using sensors comprised of CCD, CMOS or the like. Reference numeral 1403 designates a signal processing circuit, which generates digital video data after converting the electrical signals from the image sensing element 1402 from analog to digital form (A/D conversion). Reference numeral 1404 designates a video encoding circuit, which codes the digital video data to compress. Reference numeral 1407 designates a file generator circuit, which generates a moving picture data file from the coded digital video data. Reference numeral 1408 designates an error correction coding circuit, which adds parity data for performing error correction of the digital video data. Reference numeral 1409 designates a data modulation circuit, which performs such modulation coding for the purpose of recording digital video data onto a storage medium as, for example, (1, 7) Run-Length Limited (RLL) and trellis-code modulation. A magnetic modulation driver 1410 drives a magnetic head 1411 in response to input signals and imparts a magnetic field to the storage medium 1413. An optical pickup 1412 directs a laser beam for recording onto the storage medium 1413 in response to input signals. A drive controller 1416 controls the optical pick-up 1412 and a motor 1414 by outputting signals to a drive servo circuit 1415 in response to requests from a system controller 1417 so as to control the overall operation of the disk drive.

In a conventional disk video camera apparatus like that described above, editing of a video clip, which involves cutting and deleting parts of the video clip (which is a moving picture data file) is accomplished by cutting and partially deleting the video clip file itself recorded as a MPEG2 (Motion Picture Expert Group, standard 2) stream. As a result, there is no reversibility, and moreover, because the stream data itself must be rewritten in audio after-recording editing and the like, processing takes time. In addition, although a thumbnail display capability is also provided through reduced-size display screens of moving picture data, the thumbnail designations are not inherited if the moving picture file is copied, and thus the capability is less than satisfactory.

SUMMARY OF THE INVENTION

The present invention is conceived of in consideration of the above-described problems, and has as its feature to provide a moving picture recording apparatus and method thereof that provides flexibility in the editing of reference moving image data, and makes it possible to display a list of thumbnail files with high-speed and to inherit thumbnail of reference moving picture data.

According to the present invention, the foregoing object is attained by providing a moving picture recording method of recording moving picture data in a storage medium and recording reference moving picture data for referencing to the moving picture data, in a reference format for enabling synchronism between the moving picture data and the reference moving picture data, the method comprising the steps of: recording a designation data for designating a representative image in the reference moving picture data, the representative image represents the moving picture data; recording a thumbnail file comprising thumbnail images of moving picture data stored in the storage medium; and correlating the representative image designated by the designation data and a thumbnail image recorded in the thumbnail file.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings. It should be noted that although an actual video camera apparatus records audio signals together with video signals, in the present embodiments a description is given of only the video signals.

The moving picture recording apparatus according to the present embodiment records moving picture signals as compression coded moving picture data onto a storage medium such as a DVD or Blu-Ray disk. In a moving picture recording that records reference moving picture data that references the recorded moving picture data in a reference format that enables inter-data temporal synchronicity, time data that designates a frame that represents the moving picture data is recorded in the reference moving picture data. Further, thumbnail files composed of thumbnail images of moving picture data are recorded on the storage medium. By matching representative frames designated by the time data in the reference moving picture data with thumbnail image frames recorded in the thumbnail files, the moving picture recording apparatus according to the present embodiment can achieve not only flexible editing using the reference moving picture data, but can also provide to display thumbnail lists with high-speed using thumbnail files as well as inheritance of thumbnail designations when copying files using the time data in the reference moving picture data. A detailed description of the foregoing follows.

Figure 1:
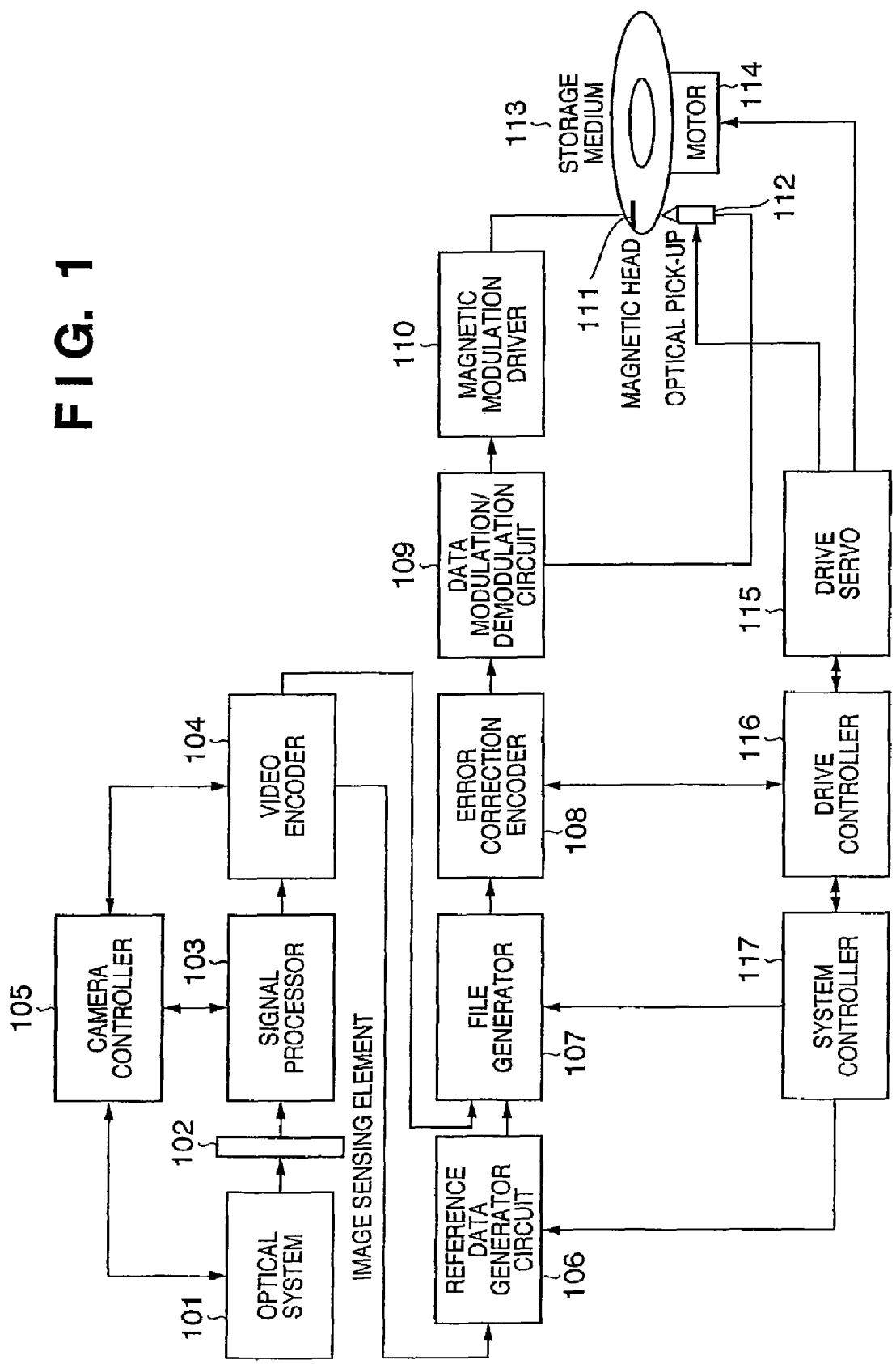
FIG. 1 is a block diagram showing the configuration of a disk video camera apparatus according to an embodiment of the present invention.

FIG. 1 is a block diagram showing the schematic configuration of a disk video camera apparatus according to an embodiment of the present invention.

In the diagram, reference numeral 101 designates the camera optical system, which focuses a subject image onto an image sensing element 102, at an appropriate focal length and exposure, by using a camera controller 105 to control driving of the focus and the aperture (f-stop). The image sensing element 102 converts light from the optical system 101 into electrical signals using sensors comprised of CCD, CMOS or the like. Reference numeral 103 designates a signal processing circuit, which generates digital video data after convening the electrical signals from the image sensing element 102 from analog to digital form (AID conversion). Reference numeral 104 designates a video encoding circuit, which compression codes the digital video data signal processed by the signal processing circuit 103 using, for example, the MPEG2 encoding method. Reference numeral 107 designates a file generator circuit, which generates, for example, a MPEG2 program stream moving picture data file that includes the compression coded digital video data. Reference numeral 108 designates an error collection coding circuit, which adds parity data for performing error correction of the digital video data. Reference numeral 109 designates a data modulation/demodulation circuit, which performs such modulation/demodulation coding for the purpose of recording digital video data onto a storage medium 113 such as, for example, a DVD or Blu-Ray disk, as, for example, (1, 7) Run-Length Limited (RLL) and trellis-code modulation. A magnetic modulation driver 110 drives a magnetic head 111 in response to input signals and imparts a magnetic field to the storage medium 113. An optical pickup 112 directs a laser beam for recording onto the storage medium 113 in response to input signals. A drive controller 116 controls the optical pick-up 112 and a motor 114 by outputting signals to a drive servo circuit 115 in response to requests from a system controller 117 so as to control the overall operation of the disk drive. A reference data generator circuit 106, under the control of the system controller 117, generates moving picture data in a reference format that references the recorded moving picture data file, and causes the file generator circuit 107 to generate a moving picture file in a reference format and record the moving picture file containing the moving picture data onto the storage medium 113 in the same way as with the moving picture data file generated by the file generator circuit 107. In the present embodiment, when the reference data generator circuit 106 generates the moving picture data in a reference format, time data of the representative frame is set as added data. As an example of the moving picture file in the reference format according to the present embodiment, a movie format such as QuickTime™ from Apple Computer, Inc. ("Apple"), for example, is known.

Figure 5:
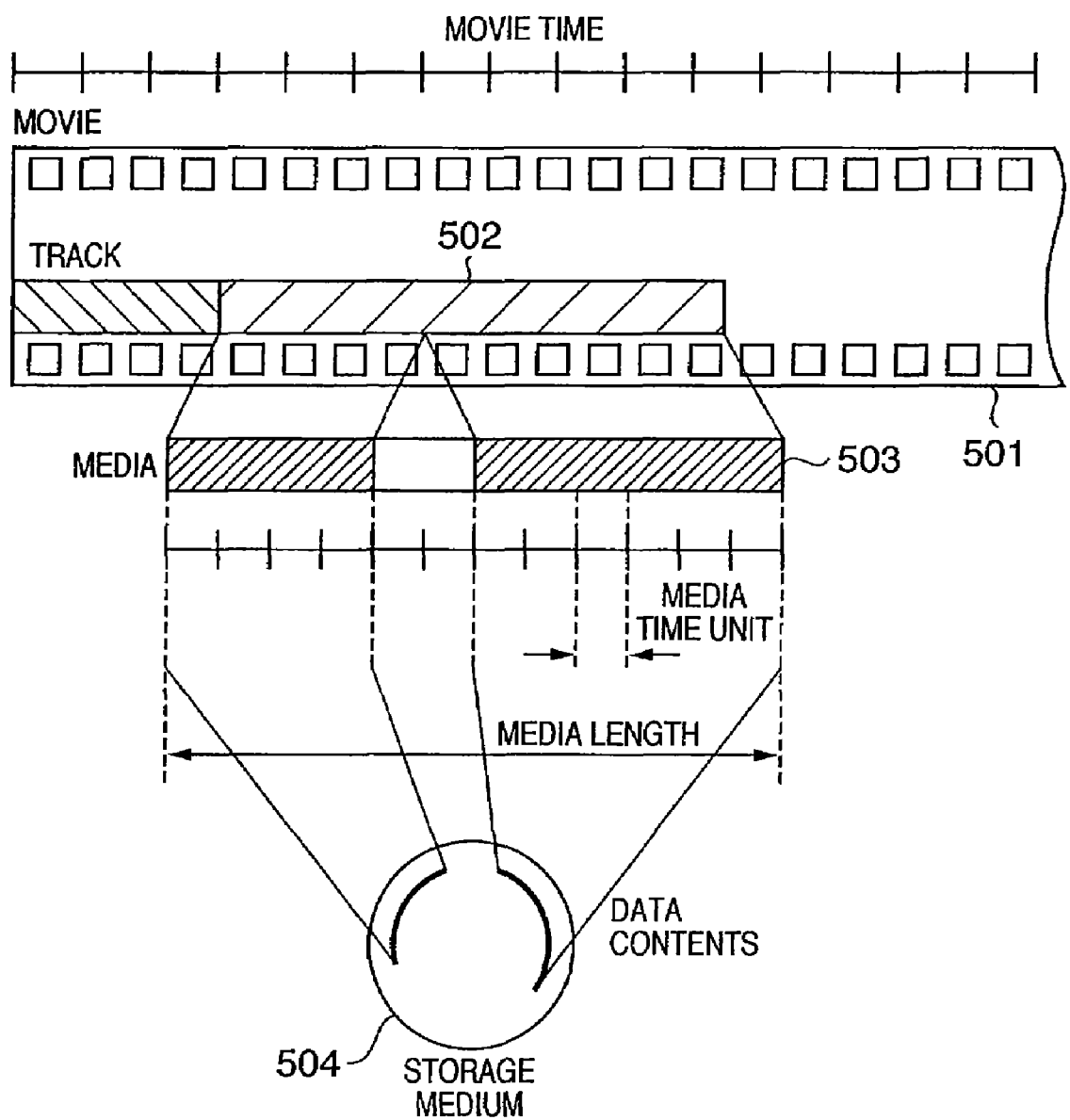
FIG. 5 depicts a diagram illustrating a schematic structure of a QuickTime™ movie.

FIG. 5 depicts a diagram illustrating a schematic structure of a QuickTime™ movie.

Reference numeral 501 designates a data structure called a movie, in which a moving picture referenced by a moving picture file in a reference format defined by QuickTime™ is managed according to time. The movie 501 can have a plurality of individual tracks, with each track corresponding to individual AV data streams actually reproduced. Reference numeral 502 designates a track of the movie 501. Data structures called media 503 that describe the contents of the tracks can be aligned on each track in time sequence. The media 503 shows the data structure of the media, and references to AV data contents actually recorded on a storage medium 504. Each of the movie 501 and the media 503 has independently its own time coordinate systems.

By managing the data contents with a reference format like QuickTime™, during recording of the movie 501, the video camera apparatus according to the present embodiment can edit (for example, partially deleting as well as cutting and splicing the movie 501) by updating the reference format data, without changing the actual video data.

Figure 2:
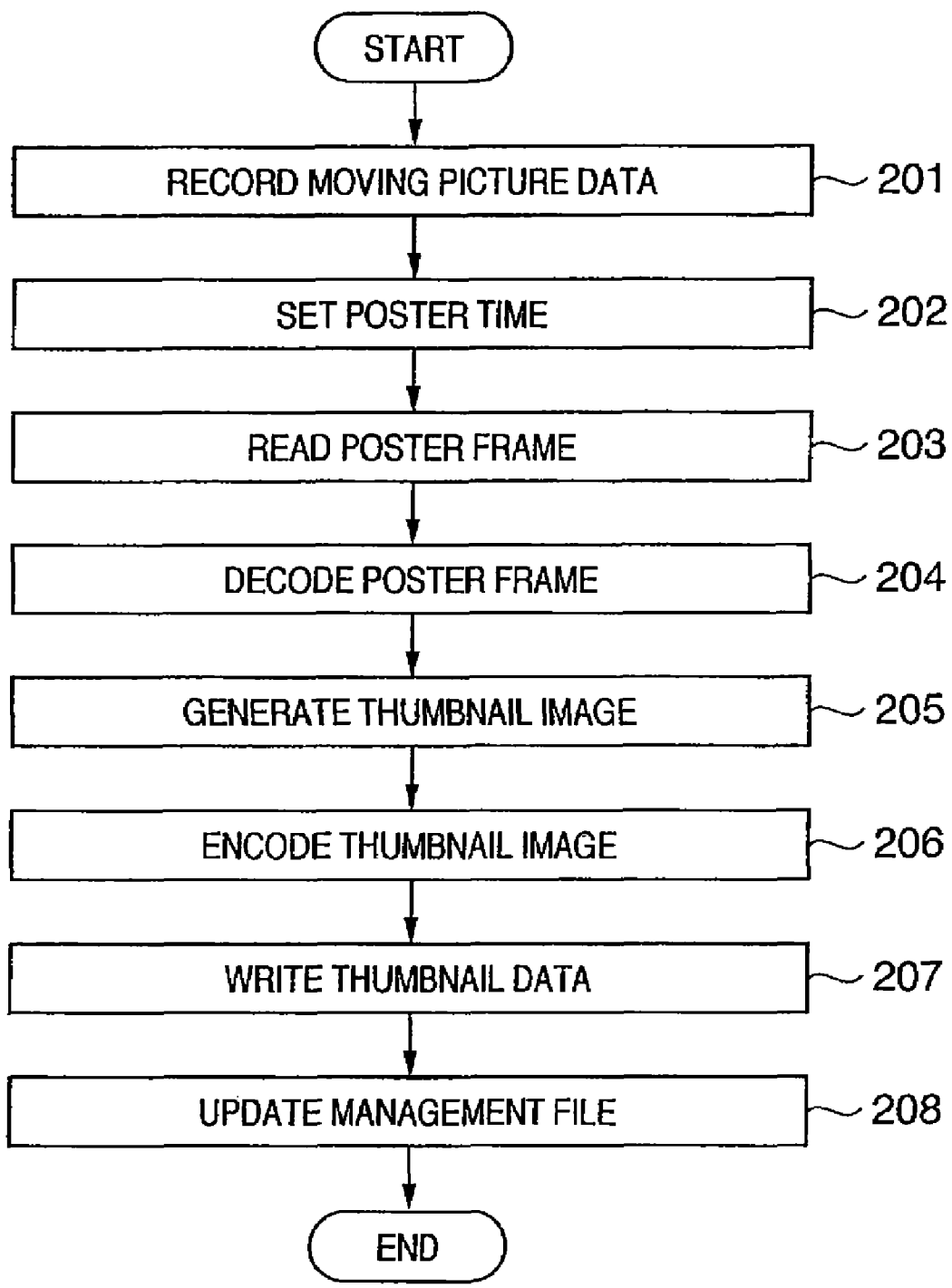
FIG. 2 is a flow chart illustrating a poster time setting and a process of writing data to a thumbnail file.

FIG. 2 is a flow chart illustrating a time setting process of a representative frame of reference moving pictures and a process of writing data to a thumbnail file containing a thumbnail image corresponding to the representative frame. It should be noted that these processes are executed under the control of the system controller 117 described above.

In FIG. 2, a step S201 shows a moving picture data recording process, and, as described with respect to FIG. 1 and FIG. 5, both a moving picture data file composed of (for example) an MPEG2 program stream as well as a QuickTime™ movie file that references the moving picture data file, are recorded on the storage medium 113. Next, in a step S202, track and time data (poster time) that express the representative frame are recorded in the QuickTime™ movie. The poster time may be set as an arbitrary frame, in which a predetermined period of time has elapsed from the head of the movie 501, or the poster time may be an arbitrary frame, in which a user selects by an input operation for the purpose of selecting the representative frame. Next, in a step S203, a poster frame is read out. The data needed to decode the moving picture frame corresponding to the set poster time is read out from the storage medium 113.

In the case of an encoding including an inter-frame encoding format of MPEG2, it is necessary to read out in coded units called GOP (Group Of Pictures). In a step S204, the frame data read out in step S203 is decoded and the frame image corresponding to the poster time is obtained. Next, in a step S205, the frame image decoded in step S204 is processed (i.e., reduced in size, etc.) and a thumbnail image is generated. Next, in a step S206, the thumbnail image obtained in step S205 is compressed using a still picture coding method such as JPEG graphics format and compressed thumbnail data is obtained. Then, in a step S207, the thumbnail data encoded in step S206 is additionally written in a dedicated thumbnail file, adding a thumbnail entry. Next, in a step S208, a management file is updated so as to correlate the recorded moving picture data with the thumbnail entry added to the thumbnail file.

Figure 11:
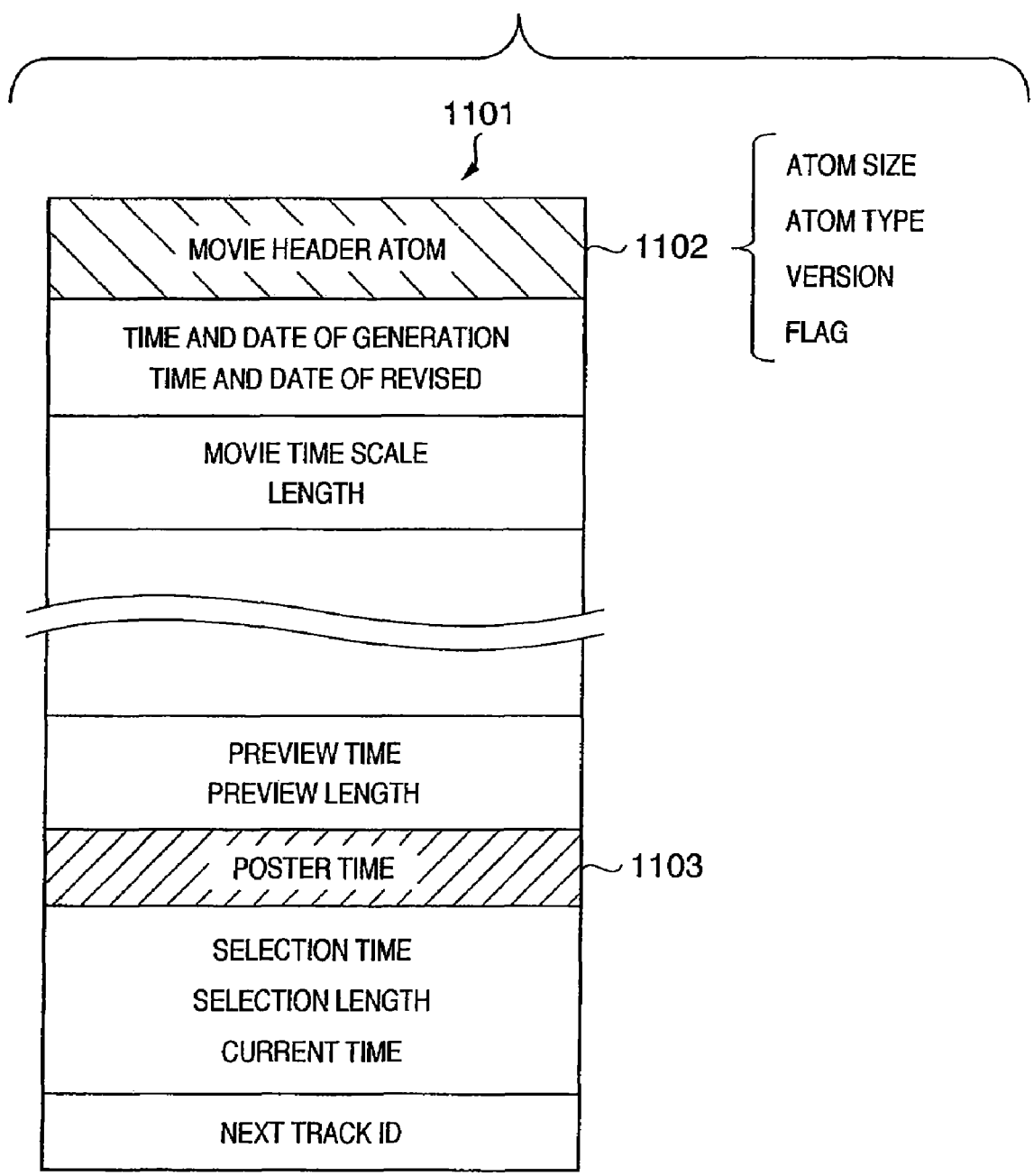
FIG. 11 depicts a diagram illustrating a schematic structure of a movie header atom of a QuickTime™ movie.

FIG. 11 depicts a diagram showing a data structure for recording data relating to a QuickTime™ movie, illustrating a poster time recorded in a "movie header atom" (1101).

In FIG. 11, reference numeral 1102 designates an ID for the "movie header atom" 1101, and the ID 1102 includes an atom size, atom type, etc. The "movie header atom" 1101 records a poster time 1103 representing time data of a representative frame, together with such data as the date and time of creation of the movie. The poster time 1103 further designates a track of the representative frame.

Figure 6:
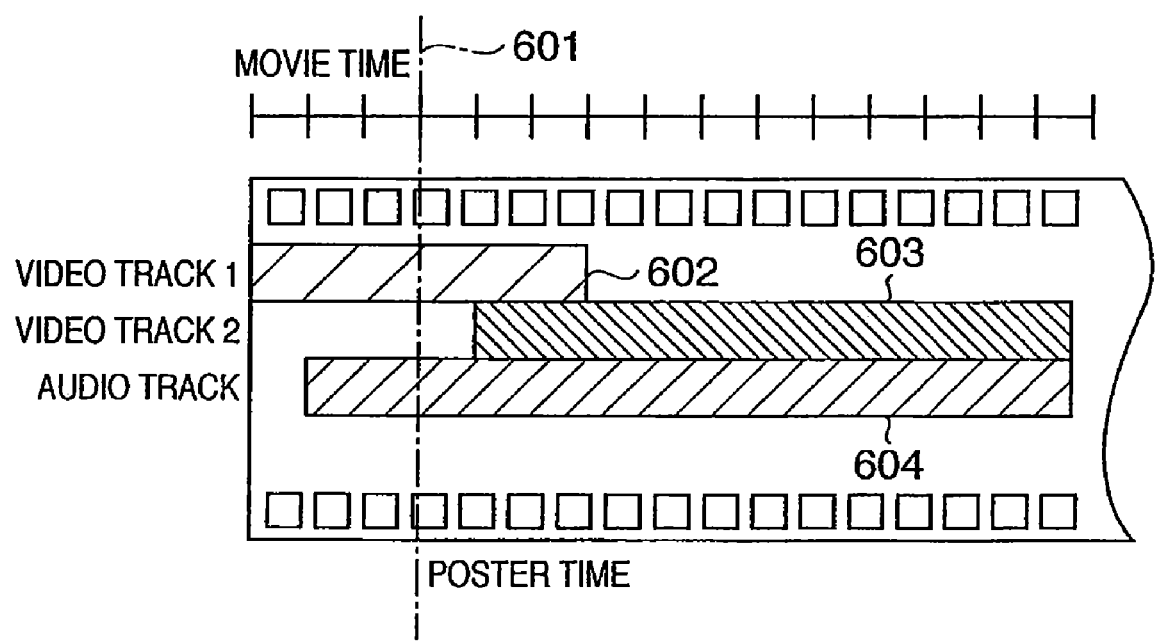
FIG. 6 depicts a diagram showing a schematic structure of a QuickTime™ movie poster time.

FIG. 6 depicts a diagram showing a relationship between a track and a poster time in the QuickTime™ movie.

In FIG. 6, reference numerals 602, 603 indicate video tracks and reference numeral 604 indicates an audio track. Reference numeral 601 indicates a time to which the poster time is set. If video track 1 is designated as the track of the poster time 601, then a reproduced frame of the video track 1 at the time designated by the poster time 601 becomes the representative frame (poster frame).

Figure 7:
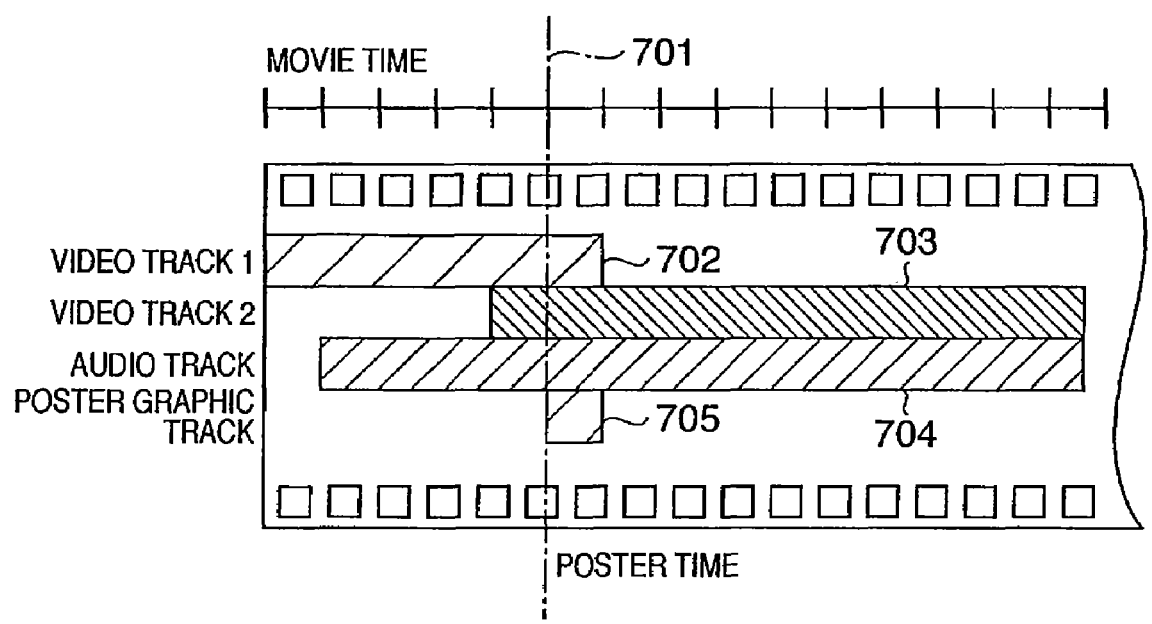
FIG. 7 depicts a diagram showing a schematic structure of a QuickTime™ movie poster graphic track.

FIG. 7 depicts a diagram showing one example of a case in which a dedicated poster graphic track 705 for designating the poster frame is provided.

In a case in which the poster graphic track 705 is designated by the poster time 701, the frame of the poster time 701 in the poster graphic track 705 instead of video tracks 1 (702), 2 (703) becomes the poster frame.

Figure 8:
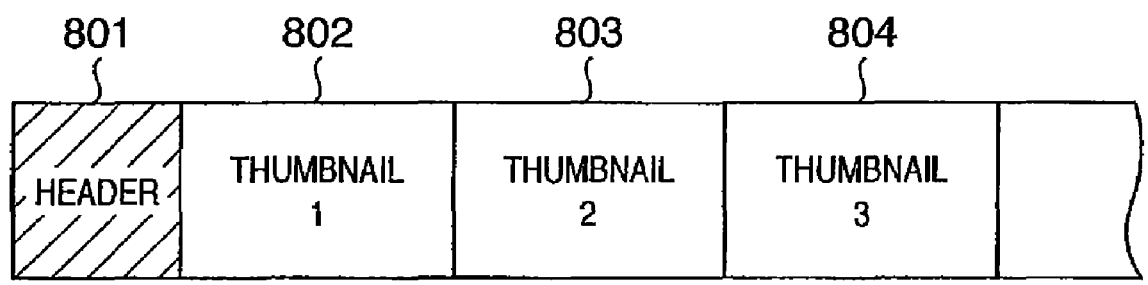
FIG. 8 depicts a diagram showing a schematic structure of a thumbnail file according to the present embodiment.

FIG. 8 depicts a diagram showing a schematic structure of the thumbnail file.

Reference numeral 801 designates the header block, which has data needed to decode the thumbnail data entry. Reference numerals 802-804 designate respective thumbnail data entries, wherein in each entry, thumbnail data extracted from a moving picture file by the method described with reference to FIG. 11 is recorded. As described above, in the present embodiment, the moving picture frame corresponding to the thumbnail data entry matches the poster frame set in the Quick Time™ movie.

Figure 9:
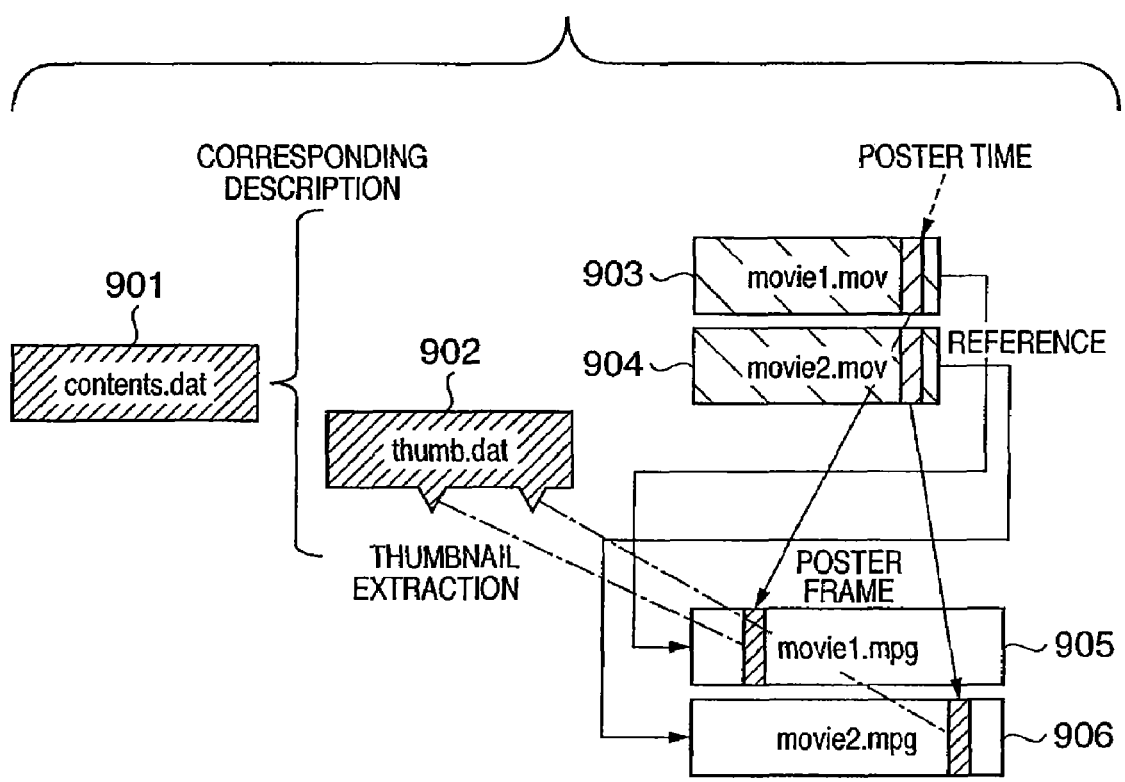
FIG. 9 depicts a diagram showing the relation between the thumbnail data according to the present embodiment.

FIG. 9 shows the relation between moving picture data files (that is, the QuickTime ™ movie files) 903, 904, reference moving picture data files 905, 906, thumbnail file 902 and a management data file 901 that describes the correlations between the files. The "movie1.mov" (903) and "movie2.mov" (904) are QuickTime™ movie files, which reference "movie1.mpg" (905) and "movie2.mpg" (906) of MPEG2 program stream, respectively. The QuickTime™ movie files 903, 904 also have poster time data, each indicating frames in the moving picture data 905, 906. Reference numeral 902 designates a thumbnail file collecting thumbnail images of AV data on the storage medium 113, including thumbnail data generated from extracted poster frames as entries, as thumbnails of "movie1.mov" 903 and "movie2.mov" 904. Reference numeral 901 designates a management data file, which correlates the movie files 903, 904 in the QuickTime™ with the thumbnail data entries of the thumbnail file 902.

Figure 10:
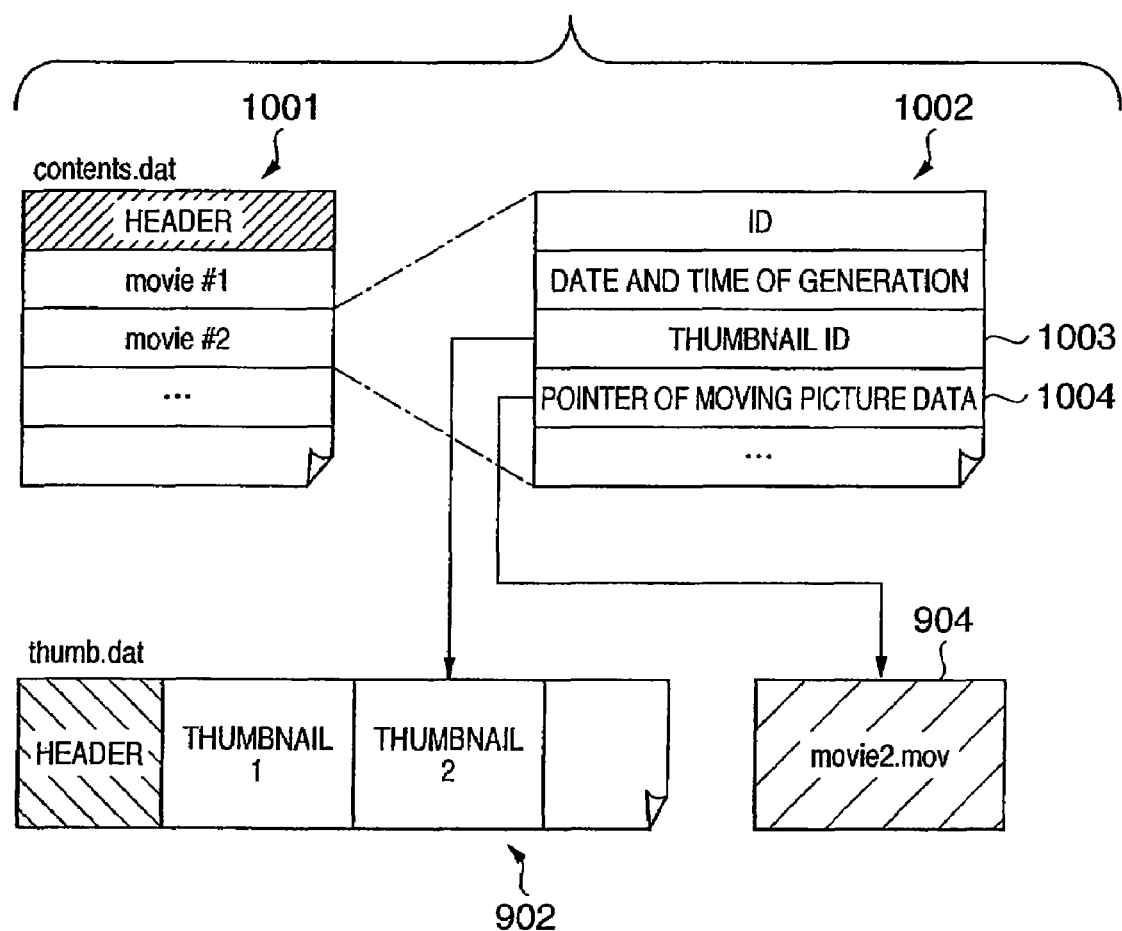
FIG. 10 depicts a diagram illustrating matching by management data according to the present embodiment.

FIG. 10 depicts a diagram illustrating the concept of correlating the movie and the thumbnail data using the management data file 901.

Reference numeral 1001 indicates a management data file 1001, which contains a header and an entry for each movie. Reference numeral 1002 indicates the schematic structure of the entries of the movie file 904, and has a thumbnail ID 1003 showing an entry of the thumbnail file 902 and a pointer 1004 to the corresponding moving picture data (here, "movie2.mov" 904).

Figure 3:
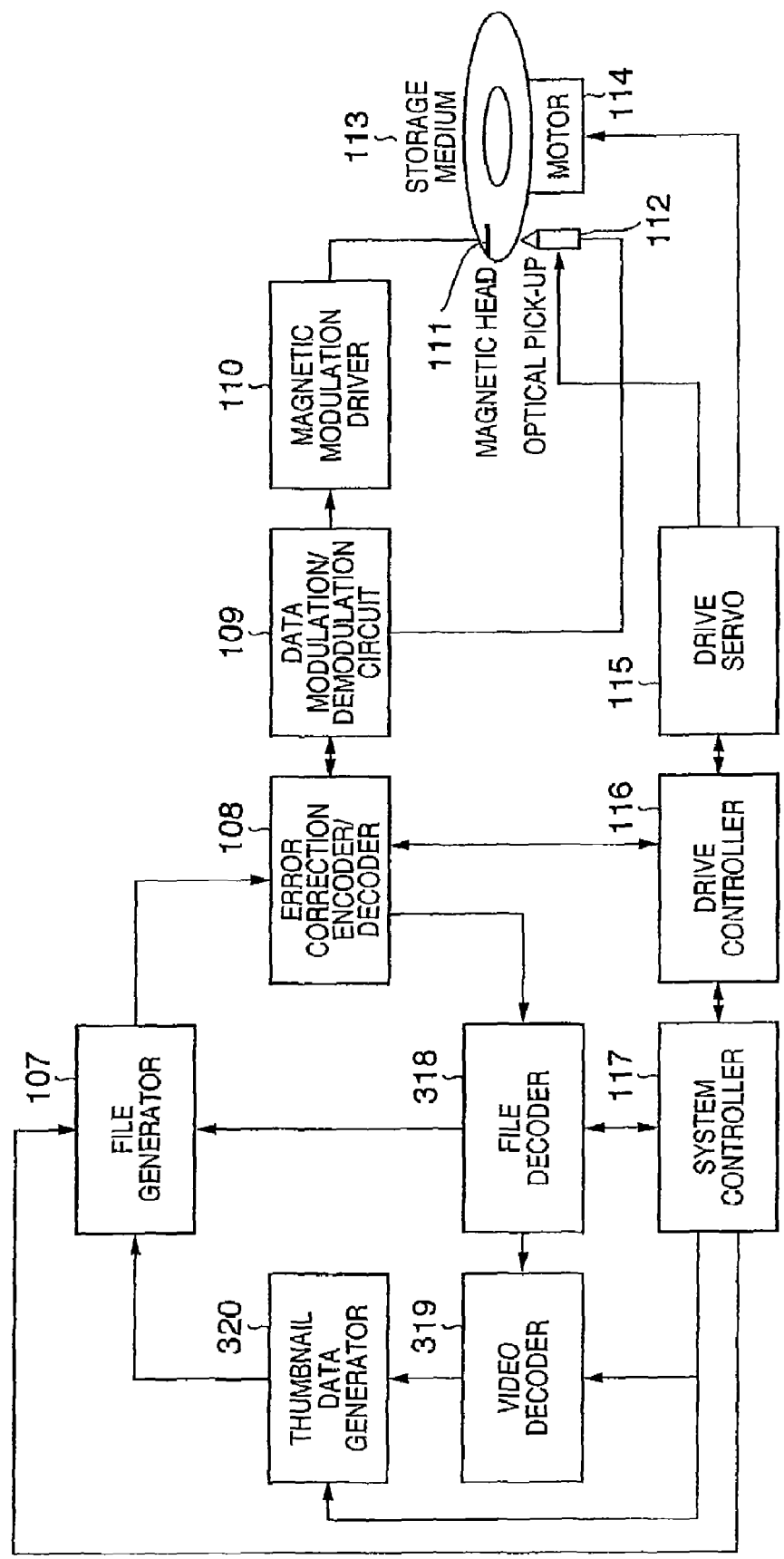
FIG. 3 depicts a diagram illustrating a functional structure during thumbnail recording of the disk video camera apparatus according to the present embodiment.

FIG. 3 depicts a block diagram illustrating schematically a process of recording a thumbnail that corresponds to the processing after step S203 in FIG. 2. It should be noted that portions in FIG. 3 that are the same as in FIG. 1 are given the same reference numerals.

After recording the moving picture data and its reference moving picture data as described in FIG. 1, the system controller 117 transmits a request to the drive controller 116 and operates the optical pick-up 112 and the motor 114 via the drive servo circuit 115 so as to read out the data block needed to decode the poster frame in the moving picture data, in order to read out the frame corresponding to the poster time from the storage medium 113. The data thus read out is demodulated from the recording signal by the data modulation/demodulation circuit 109, with defects in the storage medium 113 and errors during recording and reproduction being corrected by the error correction encoding/decoding circuit 108. A file decoder 318 decodes a logical file format from the corrected data sequence. Then, after the data has been expanded and decoded by a video decoder 319, the poster frame is extracted.

A thumbnail data generator circuit 320 reduces and encodes the poster frame with still-image encoding so as to generate an entry of thumbnail data. The file generator circuit 107 adds a new entry of thumbnail data to an existing thumbnail file. The error correction encoding/decoding circuit 108 adds parity data for error correction of digital data. The data modulation/demodulation circuit 109 carries out a modulation encoding such as (1, 7) RLL and trellis code for the purpose for recording digital data on the storage medium 113. The magnetic modulation driver 110 drives the magnetic head 111 in response to an input signal and imparts a magnetic field to the storage medium 113. The optical pickup 112 directs a laser beam for recording onto the storage medium 113 in response to the input signal. The drive controller 116 controls the optical pick-up 112 and the motor 114 by outputting signals to the drive servo circuit 115 in response to requests from the system controller 117 so as to control the overall operation of the disk drive.

Figure 12:
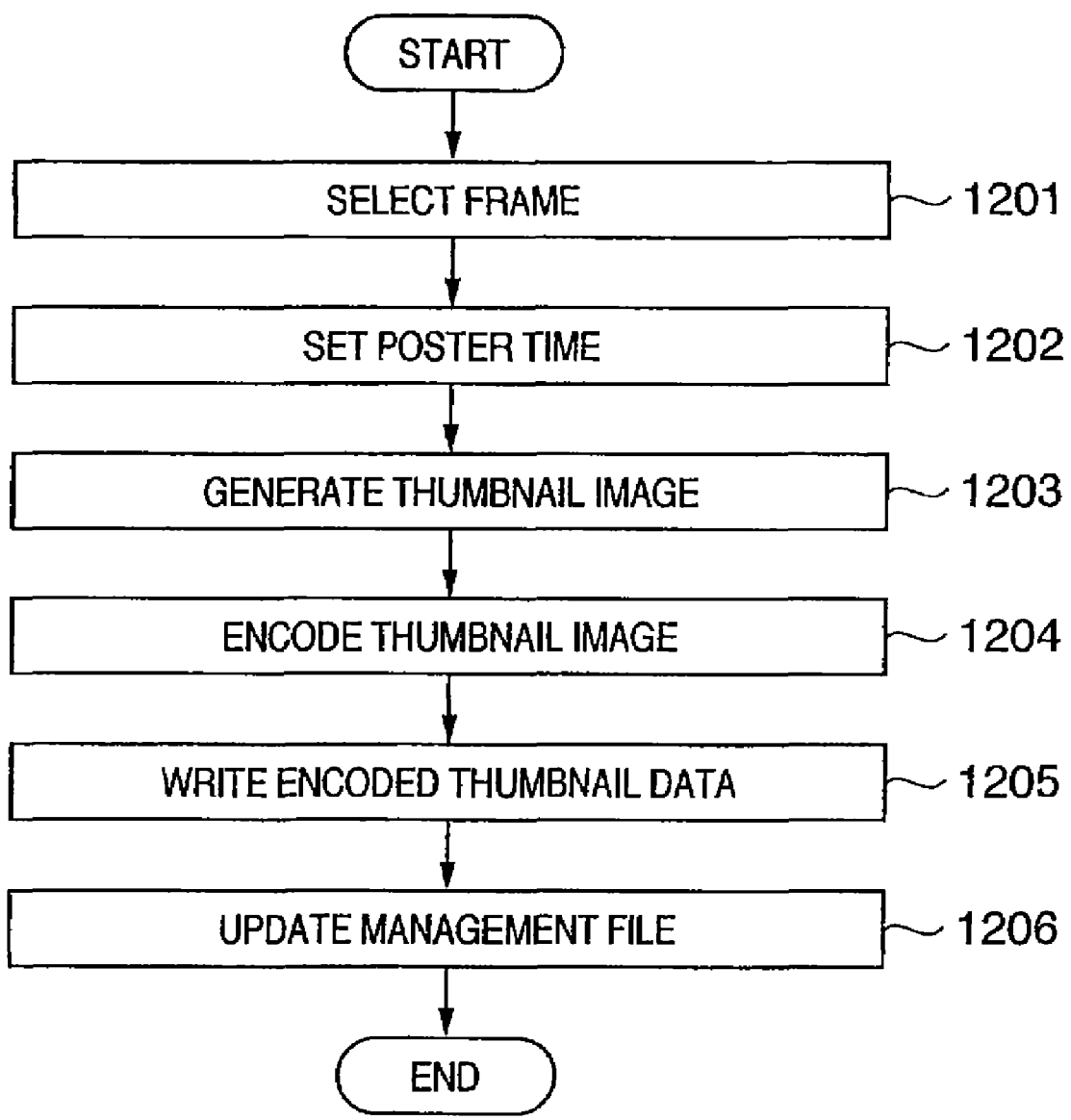
FIG. 12 is a flow chart illustrating a thumbnail change process according to the present embodiment.

FIG. 12 is a flow chart showing a process of changing a thumbnail image of moving picture that has been already recorded on the storage medium 113.

First, in a step S1201, a new representative frame is selected, by an input operation from a user or the like. Next, in a step S1202, track and time data expressing the representative frame is recorded in the QuickTime™ movie. Next, in a step S1203, the representative frame image selected in step S1201 is processed (i.e., reduced) to generate a thumbnail image. Next, in a step S1204, the thumbnail image generated in step S1203 is compressed by a still picture encoding method such as JPEG to obtain thumbnail data. Then, in a step S1205, the compressed thumbnail data coded in step S1204 is over-written in the entry of the corresponding thumbnail data in the thumbnail file, updating the thumbnail entry. Then, in a step S1206, the management file 901 for managing the moving picture file is updated as needed.

Figure 4:
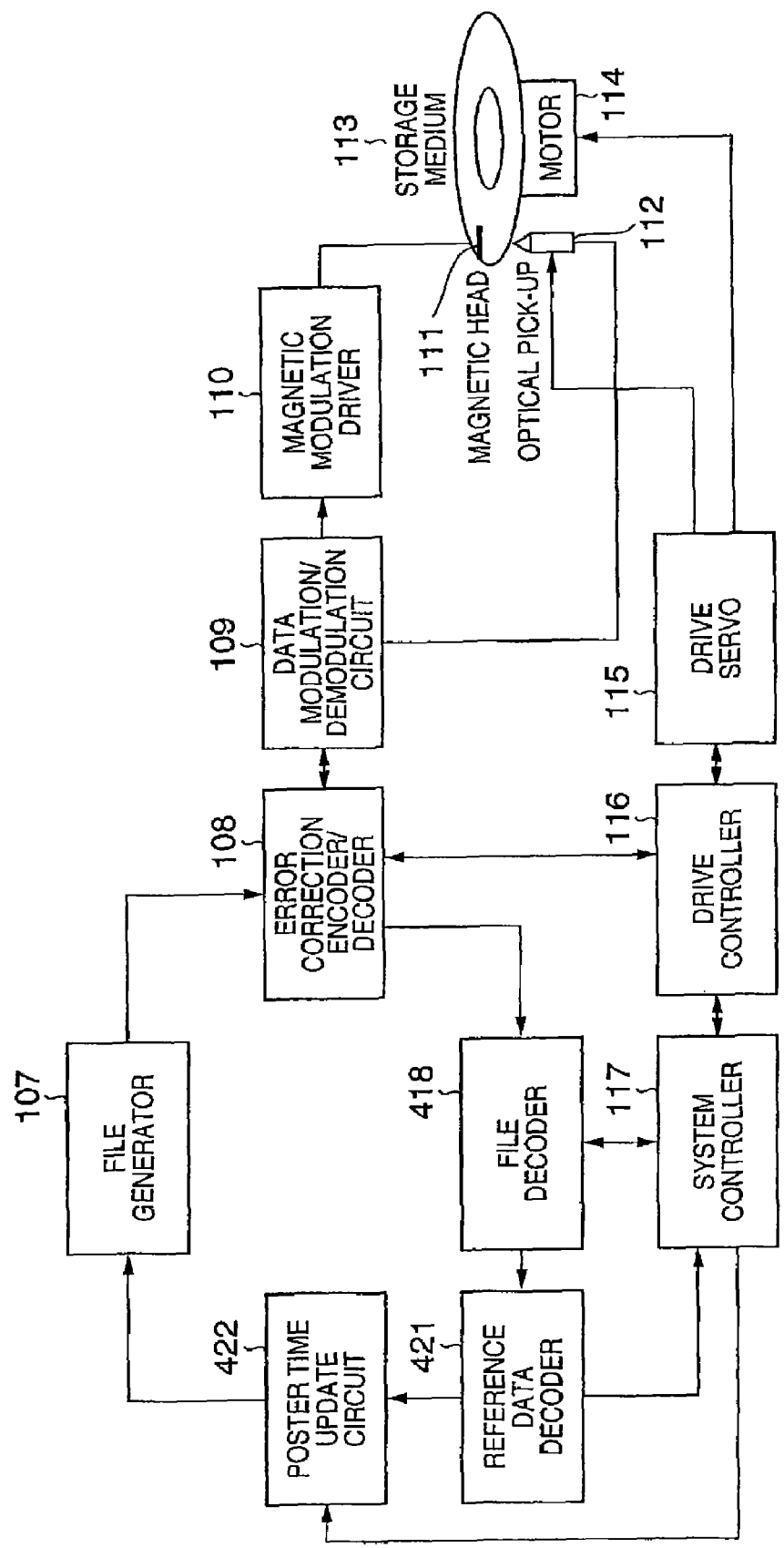
FIG. 4 depicts a diagram illustrating a functional structure during thumbnail recording of the disk video camera apparatus according to the present embodiment.

FIG. 4 depicts a diagram showing a schematic structure of setting process of the poster time in step S1202 in FIG. 12. It should be noted that portions in FIG. 4 that are the same as in FIG. 1 are given the same reference numerals.

In order to set the selected frame time data as the poster time, the system controller 117 transmits a request to the drive controller 116 and operates the optical pick-up 112 and the motor 114 via the drive servo circuit 115 so as to read out QuickTime™ movie from the storage medium 113. The read out data is demodulated by the data modulation/demodulation circuit 109, and defects in the storage medium 113 as well as errors in recording and reproduction are corrected by the error correction modulation/demodulation circuit 108. A file decoder 418 decodes a logical file format from the corrected data sequence. A reference data decoder 421 analyzes a data structure of the QuickTime™ movie, and a poster time update circuit 422 sets the time data corresponding to the frame selected in step S1201 as the poster time. At this time, as described with reference to FIG. 7, as necessary the poster graphic track 705 may be generated and the poster graphic track may be designated as the poster time.

The file generator circuit 107 generates a file composed of the QuickTime™ movie. The error correction encoding/decoding circuit 108 adds parity data for the purpose of performing digital data error correction. In order to record digital data onto the storage medium 113, the data modulation/demodulation circuit 109 carries out modulation encoding such as (1, 7) RLL and trellis-code. The magnetic modulation driver 110 drives the magnetic head 111 in response to an input signal and imparts a magnetic field to the storage medium 113. The optical pickup 112 directs a laser beam for recording onto the storage medium 113 in response to the input signal. The drive controller 116 controls the optical pick-up 112 and the motor 114 by outputting signals to the drive servo circuit 115 in response to a request from the system controller 117 so as to control the overall operation of the disk drive.

Figure 13:
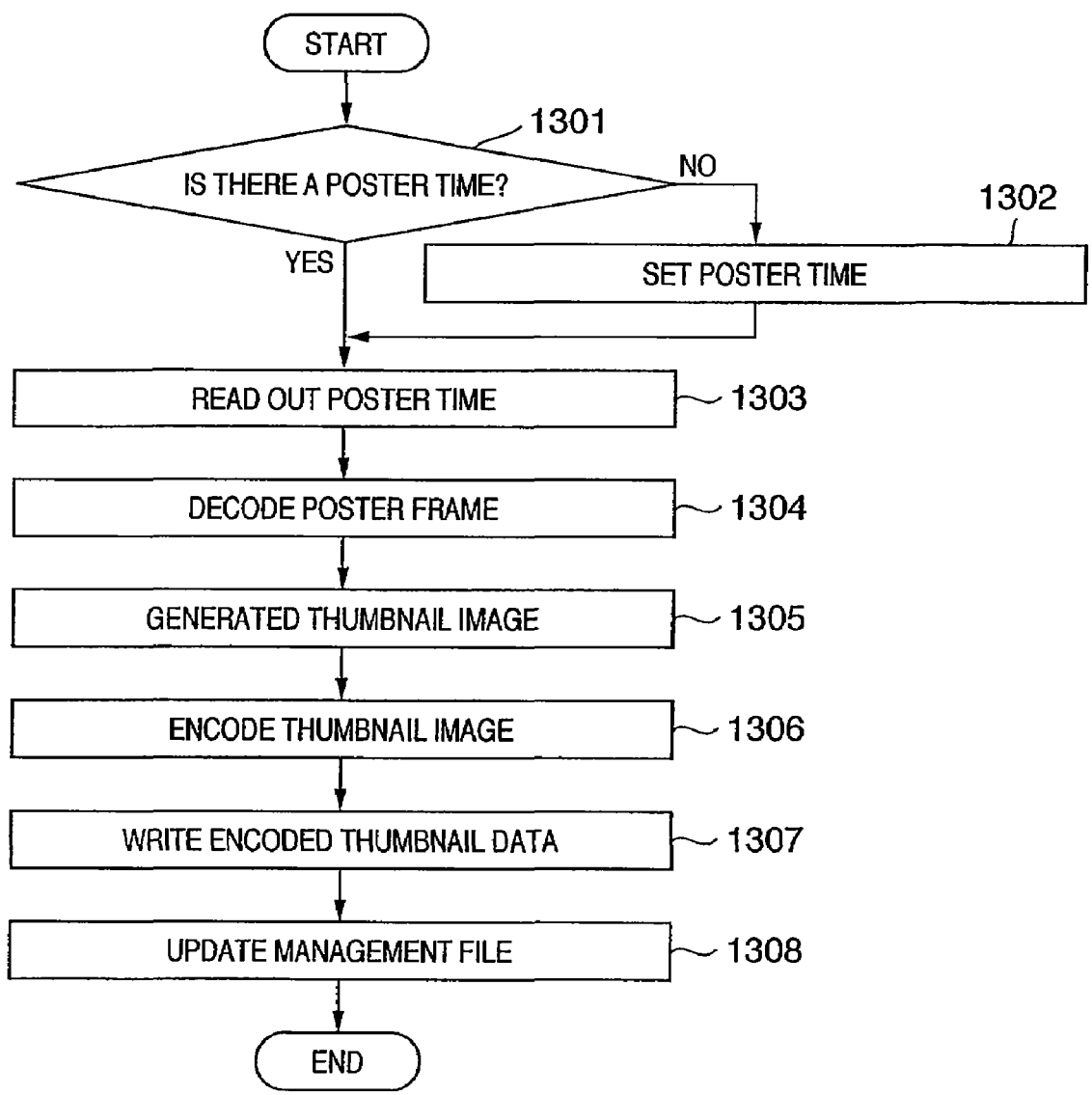
FIG. 13 is a flow chart showing a thumbnail generation process based on poster frame according to the present embodiment.
Figure 14:
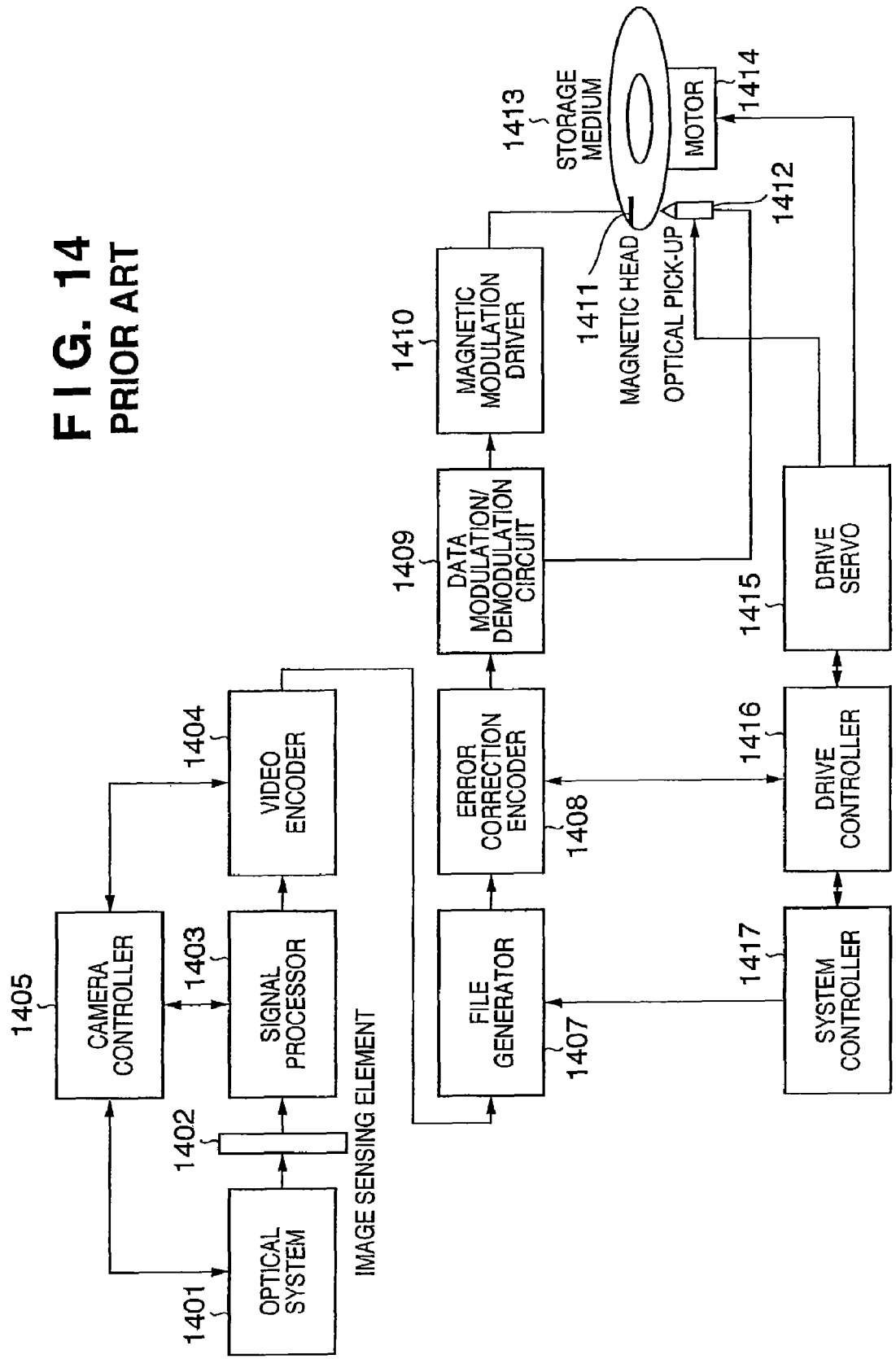
FIG. 14 depicts a diagram showing a conventional disk video camera apparatus.

FIG. 13 is a flow chart showing processing in a case in which the thumbnail file is changed, based on the poster frame of moving picture data that has been recorded in the storage medium 113.

This case arises in a case where the QuickTime™ movie and the moving picture data referring to the QuickTime™ movie are copied from other media. First, in a step S1301, it is determined whether or not there is time data designating a poster frame of the QuickTime™ movie. If there is no poster frame designation, or if the poster frame is invalid, then processing is advances to step S1302. The step S1302 shows a setting process of the poster time, in the step S1302, the track and time data expressing the representative frame is recorded in the QuickTime™ movie. The poster time may be set automatically to an arbitrary frame after a predetermined period of time from the head of the movie 501 has elapsed, or it may be an arbitrary frame selected through a user input operation for the purpose of selecting the representative frame. A step S203 shows a reading out of the designated poster frame. Here, data needed to decode the moving picture frame corresponding to the set poster time is read out from the storage medium 113. In the case of an inter-frame encoding in such as MPEG2, it is necessary to read out in coded units called GOP (Group Of Pictures). Next, in a step S1304, the frame data read out in step S1303 is decoded to obtain an image of the frame corresponding to the poster time. Next, in a step S1305, the image decoded in step S1304 is processed (i.e., reduced in size, etc.) and a thumbnail image of the image is generated. Next, in a step S1306, the thumbnail image obtained in step S1305 is compressed using a still picture coding method such as JPEG to obtain compressed thumbnail data. Then, in a step S1307, the thumbnail data encoded in step S1306 is written and added to a dedicated thumbnail file, adding a thumbnail entry. Then, in a step S1308, the management file is updated so as to correlate the recorded moving picture data with the thumbnail entry added to the thumbnail file.

According to the present embodiment described above, by matching a representative frame designated by time data in reference moving picture data with the corresponding thumbnail image recorded in the thumbnail file, flexible editing of reference moving picture data can be achieved. A list of thumbnail images can be displayed at high speed using thumbnail-dedicated files, and a designation of thumbnail image is maintained using time data in the reference moving picture data when copying files.

OTHER EMBODIMENTS

As described above, the object of the present invention can also be achieved by supplying a storage medium storing software program code that implements the functions of the foregoing embodiment to a system or apparatus, reading the program code stored on the storage medium with a computer (or CPU or MPU) of the system or apparatus, and then executing the program code. In this case, the program code read from the storage medium itself implements the functions of the foregoing embodiment, and the storage medium storing the program code constitutes the invention. Examples of storage media that can be used for supplying the program code are a floppy (registered trademark) disk, a hard disk, an optical disk, a magneto-optical disk, a CD-ROM, a CD-R, a magnetic tape, a non-volatile type memory card, a ROM, and a DVD (DVD-ROM and a DVD-R).

In addition, the invention includes not only the functions of the foregoing embodiment being implemented by a computer executing the read-out program code but also a case in which an OS (operating system) or the like running on the computer performs all or a part of the actual processing based on instructions of the program code, with the functions of the foregoing embodiment implemented by that processing.

Furthermore, the invention also includes a case in which, after the program read from the storage medium is written to a function expansion board inserted into the computer or to a memory provided in a function expansion unit connected to the computer, a CPU or the like mounted on the function expansion board or function expansion unit performs all or a part of the actual processing, with the functions of the foregoing embodiment implemented by that processing.

The present invention is not limited to the above-described embodiments, and various changes and modifications can be made thereto within the spirit and scope of the present invention. Therefore, to apprise the public of the scope of the present invention, the following claims are made.

What is claimed is:

1. An apparatus-implemented moving picture recording method of recording moving picture stream data in a storage medium and recording reference moving picture data for referencing the moving picture stream data, in a format for enabling synchronism between the moving picture stream data and the reference moving picture data, the method comprising the steps of:

recording the reference moving picture data having reference data for referencing the moving picture stream data which is separately stored in the storage medium;

setting designation data for designating a representative image in the reference moving picture data, wherein the representative image represents the moving picture stream data;

recording a thumbnail file comprising thumbnail images of the moving picture stream data stored in the storage medium; and recording management data to correlate the representative image designated by the designation data in the reference moving picture data with a thumbnail image recorded in the thumbnail file corresponding to the moving picture stream data referenced by the reference moving picture data.

2. The moving picture recording method according to claim 1, further comprising a step of:

in a case where a thumbnail image of the thumbnail file is updated, updating the designation data of the representative image corresponding to the updated thumbnail image.

3. The moving picture recording method according to claim 1, further comprising the step of:

in a case where moving picture stream data having no thumbnail image in the thumbnail file as well as reference moving picture data that references the moving picture stream data are added, (a) generating a thumbnail image of a frame corresponding to time data of the representative image and adding the thumbnail image to the thumbnail file, if there is the time data in the reference moving picture data, and (b) determining a frame in the reference moving picture data as a representative image, after a predetermined period of time has elapsed from the head of the moving picture stream data, and adding time data of the representative image to the reference moving picture data, and adding a thumbnail image of the representative image to the thumbnail file, if there is no time data in the reference moving picture data.

4. The moving picture recording method according to claim 1, wherein a data format of the reference moving picture data is QuickTime™ movie format.

5. The moving picture recording method according to claim 4, wherein the representative image of the reference moving picture data is a poster frame in the QuickTime™ movie format.

6. A moving picture recording apparatus for recording moving picture stream data in a storage medium and recording reference moving picture data for referencing the recorded moving picture stream data, in a format for enabling synchronism between the moving picture stream data and the reference moving picture data, the apparatus comprising:

a first recording unit which records the reference moving picture data having reference data for referencing the moving picture stream data which is separately stored in the storage medium;

a setting unit which sets designation data in the reference moving picture data, wherein the designation data designates a representative image for representing the moving picture stream data;

a second recording unit which records a thumbnail file containing thumbnail images of the moving picture stream data stored in the storage medium; and a third recording unit which records management data to correlate the representative image designated by the designation data in the reference moving picture data with a thumbnail image recorded in the thumbnail file corresponding to the moving picture stream data referenced by the reference moving picture data.

7. The moving picture recording apparatus according to claim 6, wherein said third recording unit updates the designation data of the representative image corresponding to the updated thumbnail image, in a case where the thumbnail image of the thumbnail file is updated.

8. The moving picture recording apparatus according to claim 6, further comprising:

a generation unit which generates a thumbnail image of a frame corresponding to time data of the representative image and adding the thumbnail image to the thumbnail file, if there is the time data in the reference moving picture data, in a case where moving picture stream data having no thumbnail image in the thumbnail file as well as reference moving picture data that references the moving picture stream data are added; and a determination unit which determines a frame in the reference moving picture data as a representative image, after a predetermined period of time has elapsed from the head of the moving picture stream data, and adding time data of the representative image to the reference moving picture data, and adding a thumbnail image of the representative image to the thumbnail file, if there is no time data in the reference moving picture data.

9. The moving picture recording apparatus according to claim 6, wherein a data format of the reference moving picture data is QuickTime™ movie format.

10. The moving picture recording apparatus according to claim 9, wherein the representative image of the reference moving picture data is a poster frame in the QuickTime™ movie format.

* * * * *